United States Patent
Cho et al.

(10) Patent No.: US 10,462,700 B2
(45) Date of Patent: Oct. 29, 2019

(54) METHOD FOR PERFORMING REFLECTIVE QUALITY OF SERVICE (QOS) IN WIRELESS COMMUNICATION SYSTEM AND A DEVICE THEREFOR

(71) Applicant: LG ELECTRONICS INC., Seoul (KR)

(72) Inventors: Heejeong Cho, Seoul (KR); Seungjune Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/248,686

(22) Filed: Jan. 15, 2019

(65) Prior Publication Data

US 2019/0150023 A1    May 16, 2019

Related U.S. Application Data

(63) Continuation of application No. PCT/KR2018/000978, filed on Jan. 23, 2018.

(60) Provisional application No. 62/453,467, filed on Feb. 1, 2017.

(51) Int. Cl.
H04W 28/02    (2009.01)

(52) U.S. Cl.
CPC ....... H04W 28/0268 (2013.01); H04W 28/02 (2013.01)

(58) Field of Classification Search
CPC .. H04L 47/10; H04W 28/02; H04W 28/0205; H04W 28/021; H04W 28/0247; H04W 28/0252; H04W 28/0257; H04W 28/0263; H04W 28/0268; H04W 28/0273
See application file for complete search history.

(56) References Cited

U.S. PATENT DOCUMENTS

| | | | |
|---|---|---|---|
| 2018/0213540 A1* | 7/2018 | Chiu | H04W 28/02 |
| 2018/0242205 A1* | 8/2018 | Mildh | H04W 36/0055 |
| 2018/0317120 A1* | 11/2018 | Wang | H04W 28/0263 |
| 2019/0075482 A1* | 3/2019 | Eriksson | H04W 28/0263 |

OTHER PUBLICATIONS

PCT International Search Report and Written Opinion in International Appln. No. PCT/KR2018/000978, dated Apr. 20, 2018, 10 pages.
Nokia, Alcatel-Lucent Shanghai Bell, "DL and UL QoS markings on NG3 interface", R3-170215, 3GPP TSG-RAN WG3 Meeting #adhoc, Spokane, USA, Jan. 17-19, 2017, 4 pages.

(Continued)

Primary Examiner — Sharad Rampuria
(74) Attorney, Agent, or Firm — Fish & Richardson P.C.

(57) ABSTRACT

The present invention relates to a wireless communication system. More specifically, the present invention relates to a method and a device for performing reflective QoS in wireless communication system, the method comprising: receiving a DL SDAP PDU via a DL DRB with a first DRB ID from a network, wherein the DL SDAP PDU includes a first indicator indicating whether to perform updating AS mapping rule for UL and a second indicator indicating whether to perform updating NAS reflective QoS rule for UL; and performing the updating of the AS mapping rule for UL or the updating of the NAS reflective QoS rule for the UL according to the first indicator and the second indicator.

17 Claims, 21 Drawing Sheets

(56) References Cited

OTHER PUBLICATIONS

Samsung, "NR QOS—As handling of a New QOS flow", R2-1700030, 3GPP TSG-RAN WG2 Meeting #96bis, Spokane, USA, Jan. 17-19, 2017, 4 pages.
Nokia, Alcatel-Lucent Shanghai Bell, "Reflective QoS in AS", R2-1700064, 3GPP TSG-RAN WG2 Meeting NR Adhoc, Spokane, USA, Jan. 17-19, 2017, 2 pages.
Nokia, Alcatel-Lucent Shanghai Bell, "Reflective QoS principles in Access Stratum", R3-170214, 3GPP TSG-RAN WG3Meeting NR Adhoc, Spokane, USA, Jan. 17-19, 2017, 2 pages.
CATT, "DRB management and NR QoS", R2-166113, 3GPP TSG RAN WG2 Meeting #95bis, Kaohsiung, Oct. 10-14, 2016, 5 pages.
Huawei, HiSilicon, "Further Considerations of Flow to DRB Mapping", R2-167577, 3GPP TSG-RAN2 Meeting #96, Reno, USA, Nov. 14-18, 2016, 4 pages.
Samsung, "NR Qos model for UL and DL", R2-168057, 3GPP TSG-RAN WG2 Meeting #96, Reno, USA, Nov. 14-18, 2016, 5 pages.
Ericsson, "QoS framework for NR", R2-168657, 3GPP TSG-RAN WG2 Meeting #96, Reno, Nevada, USA, Nov. 14-18, 2016, 6 pages.

\* cited by examiner (a) Control-Plane Protocol Stack (b) User-Plane Protocol Stack (a) Control-Plane Protocol Stack (b) User-Plane Protocol Stack

METHOD FOR PERFORMING REFLECTIVE QUALITY OF SERVICE (QOS) IN WIRELESS COMMUNICATION SYSTEM AND A DEVICE THEREFOR

CLAIM OF PRIORITY

This application is the National Phase of PCT International Application No. PCT/KR2018/000978, filed on Jan. 23, 2018, which claims the benefit of U.S. Provisional Application No. 62/453,467, filed on Feb. 1, 2017, which are all hereby incorporated by reference herein in their entirety.

TECHNICAL FIELD

The present invention relates to a wireless communication system and, more particularly, to a method for performing reflective Quality of Service (QoS) in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing reflective Quality of Service (QoS) in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, it is proposed of performing update of UL AS mapping rule and/or UL NAS mapping rule by receiving each indication for NAS-level reflective QoS activation and AS-level reflective QoS activation.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
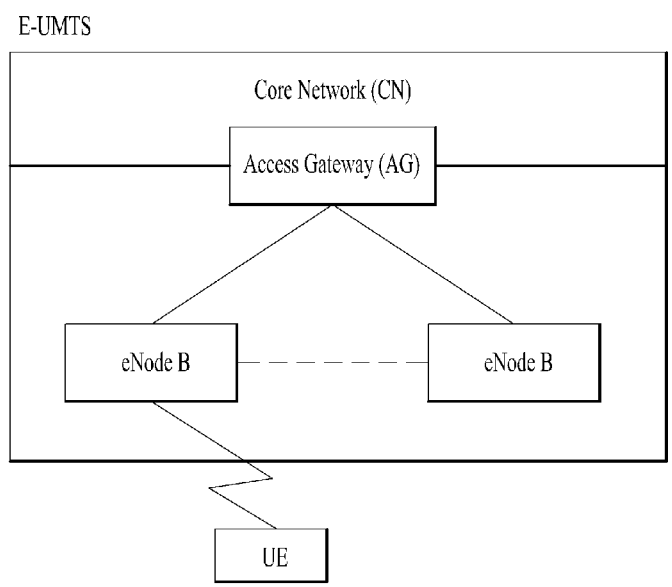
FIG. 1 is a diagram showing a network structure of an Evolved Universal Mobile Telecommunications System (E-UMTS) as an example of a wireless communication system.
Figure 2A:
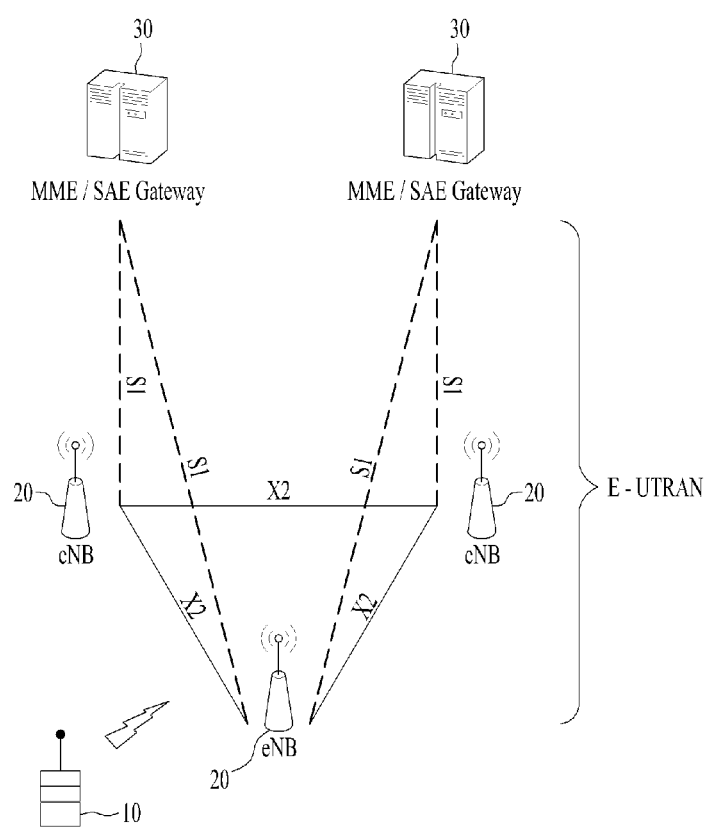
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
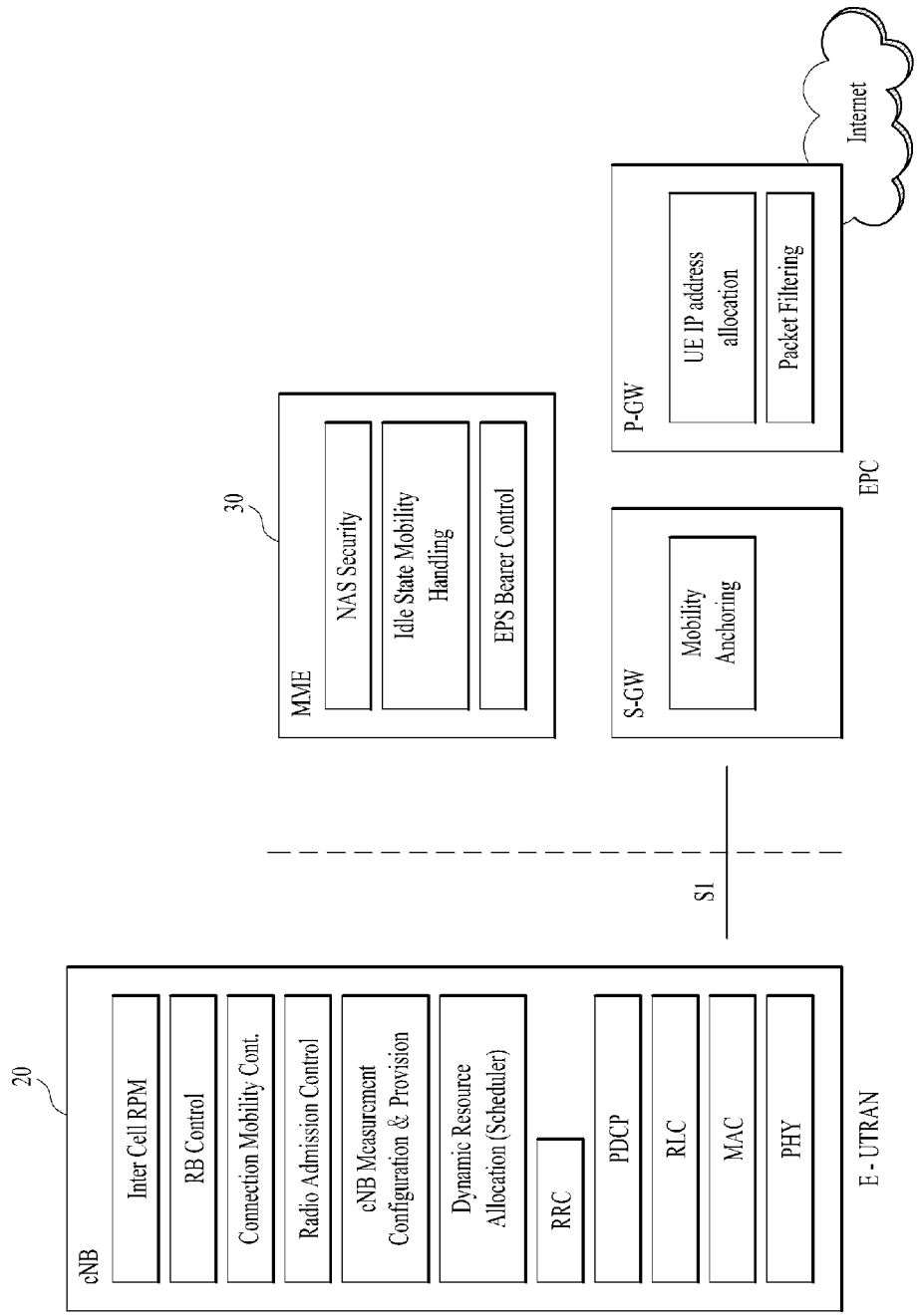
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
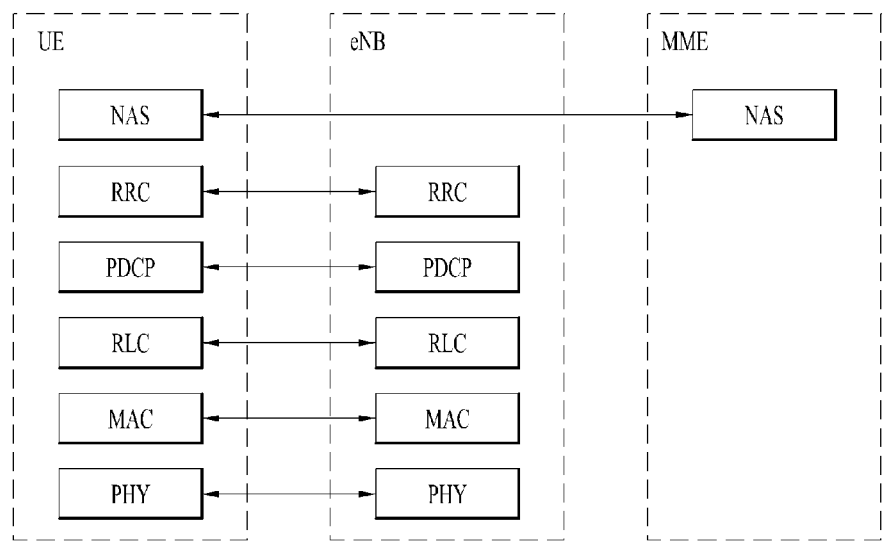
FIG. 3 is a diagram showing a control plane and a user plane of a radio interface protocol between a UE and an E-UTRAN based on a 3rd generation partnership project (3GPP) radio access network standard.
Figure 3:
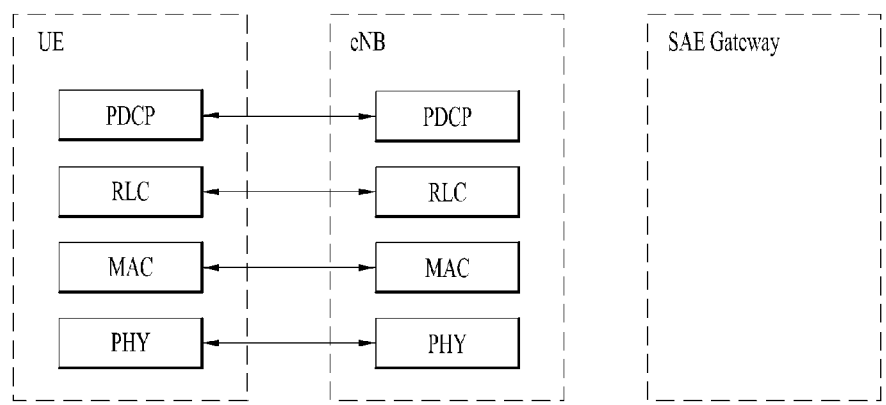

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
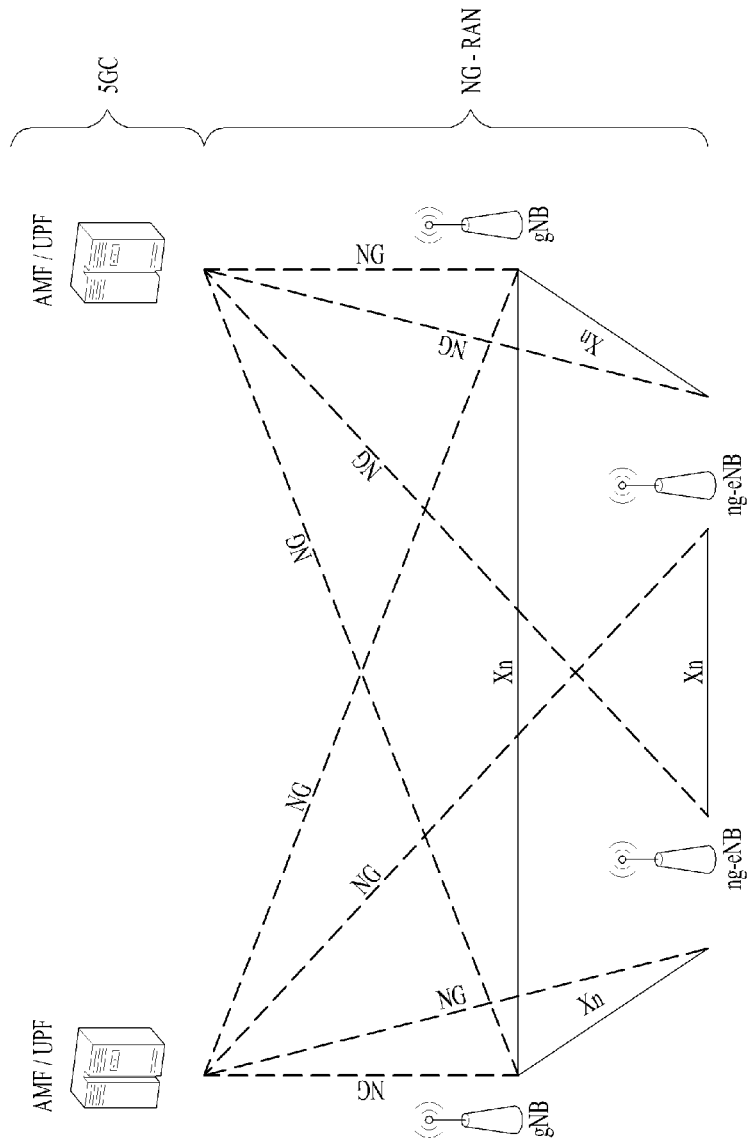
FIG. 4A is a block diagram illustrating network structure of NG Radio Access Network (NG-RAN) architecture.
Figure 4B:
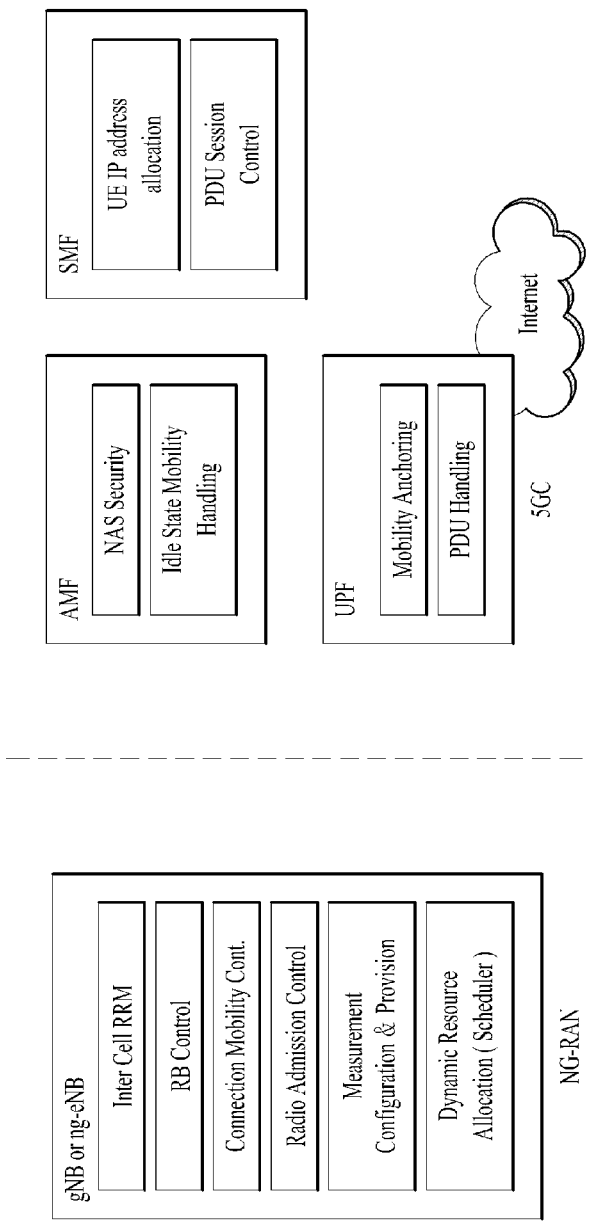
FIG. 4B is a block diagram depicting architecture of functional Split between NG-RAN and 5G Core Network (5GC)

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP.

The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
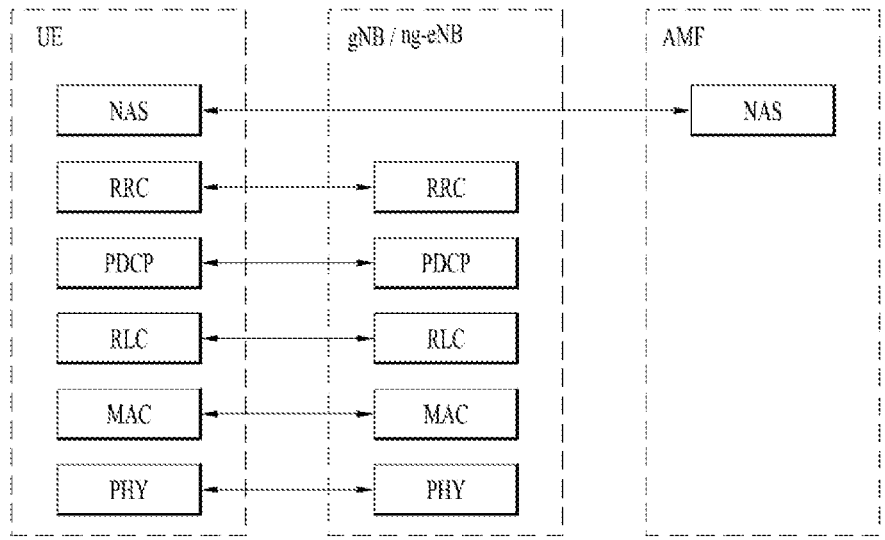
FIG. 5 is a diagram showing a control plane and a user plane of a radio interface protocol between a UE and a NG-RAN based on a 3rd generation partnership project (3GPP) radio access network standard.
Figure 5:
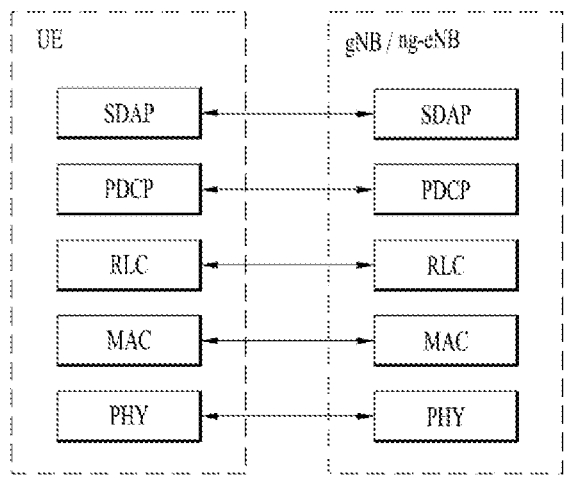

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
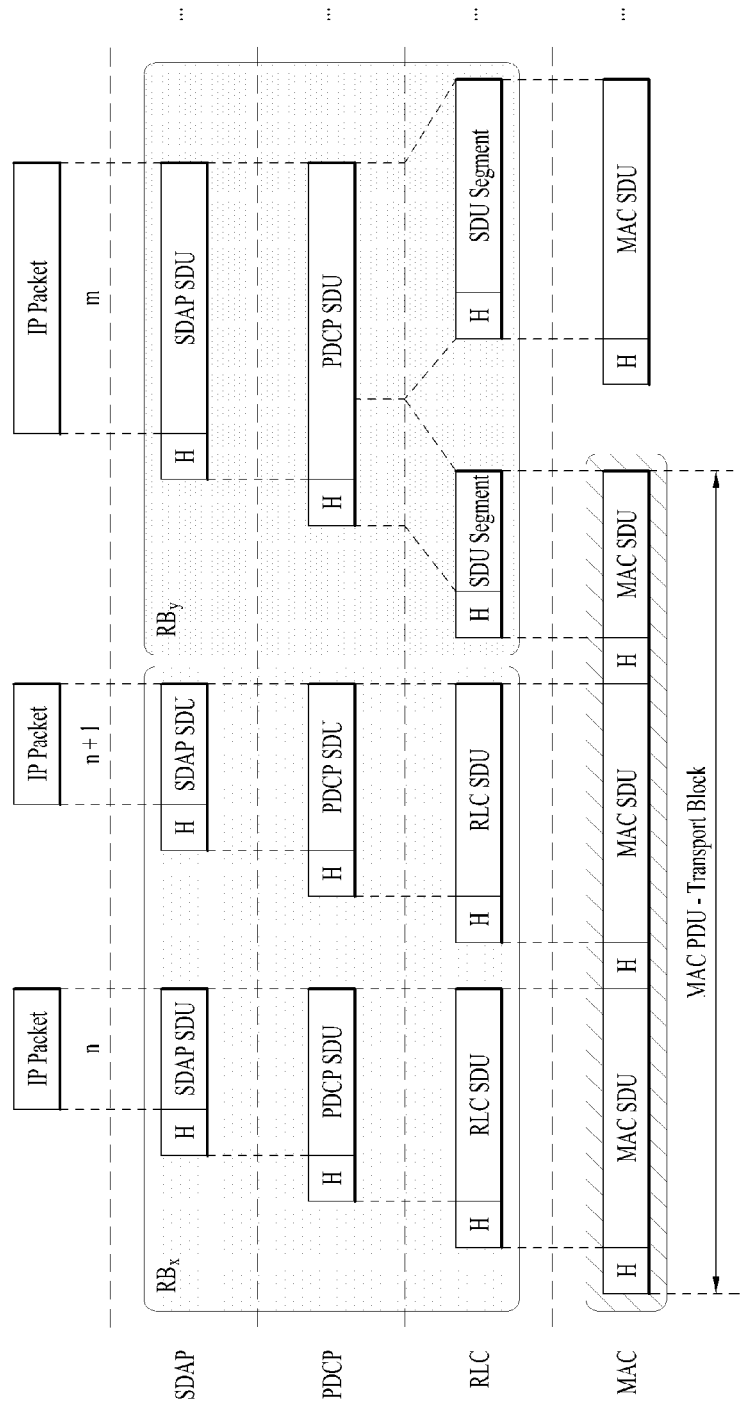
FIG. 6 is an example for L2 data flow between a UE and a NG-RAN.

FIG. 6 is an example for L2 data flow between a UE and a NG-RAN.

An example of the Layer 2 Data Flow is depicted on FIG. 6, where a transport block is generated by MAC by concatenating two RLC PDUs from RBx and one RLC PDU from RBy. The two RLC PDUs from RBx each corresponds to one IP packet (n and n+1) while the RLC PDU from RBy is a segment of an IP packet (m).

Figure 7:
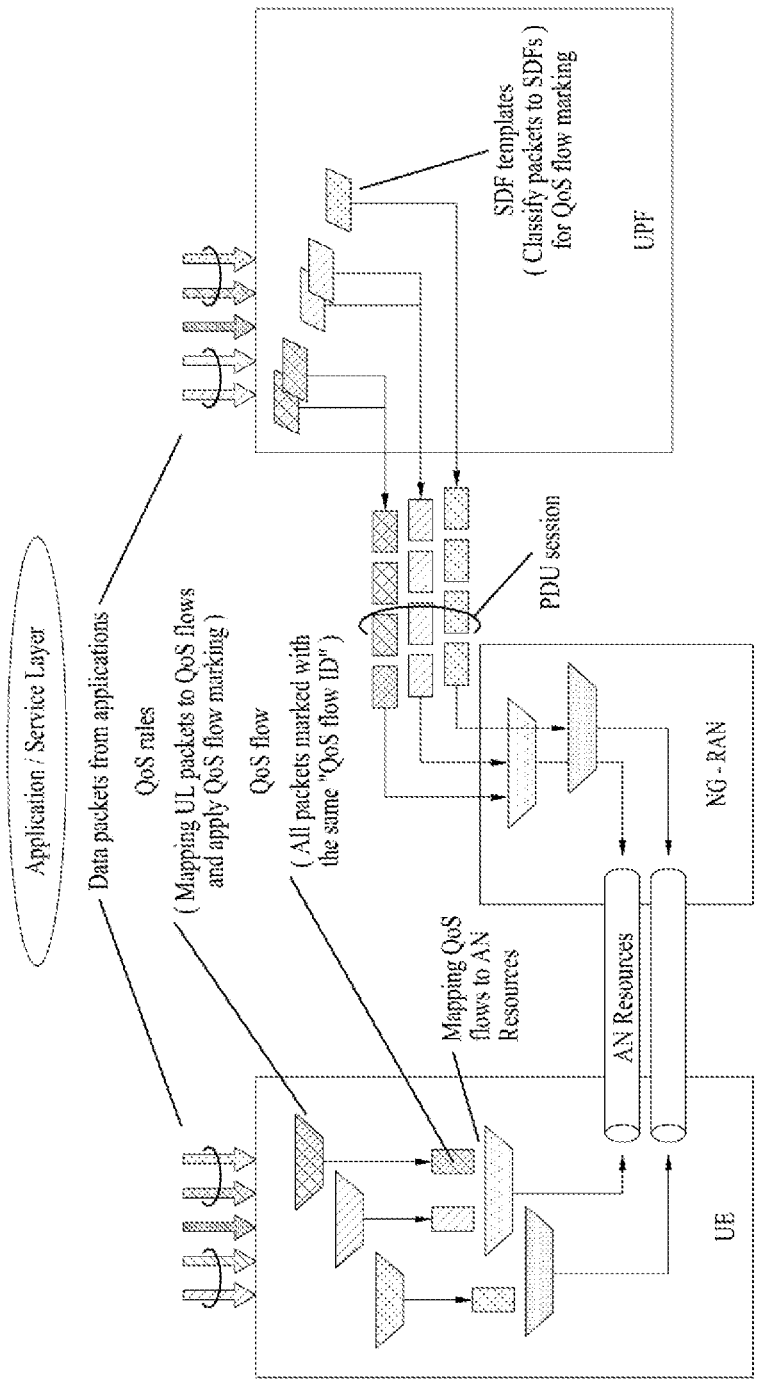
FIG. 7 is a diagram for classification and user plane marking for QoS flows and mapping to NG-RAN resources.

FIG. 7 is a diagram for classification and user plane marking for QoS flows and mapping to NG-RAN resources.

The 5G QoS model is based on QoS flows. The 5G QoS model supports both QoS flows that require guaranteed flow bit rate (GBR QoS flows) and QoS flows that do not require guaranteed flow bit rate (non-GBR QoS flows). The 5G QoS model also supports reflective QoS.

The QoS flow is the finest granularity of QoS differentiation in the PDU session. A QoS Flow ID (QFI) is used to identify a QoS flow in the 5G System. User plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU session types. The QFI shall be unique within a PDU session. The QFI may be dynamically assigned or may be equal to the 5QI.

Within the 5G System, a QoS flow is controlled by the SMF and may be preconfigured, or established via the PDU Session Establishment procedure, or the PDU Session Modification procedures.

Any QoS flow is characterized by: i) a QoS profile provided by the SMF to the NG-RAN via the AMF over the N2 reference point or preconfigured in the NG-RAN, ii) one or more QoS rule(s) which can be provided by the SMF to the UE via the AMF over the N1 reference point and/or derived by the UE by applying reflective QoS control, and iii) one or more SDF templates provided by the SMF to the UPF.

The UE performs the classification and marking of UL user plane traffic, i.e. the association of UL traffic to QoS flows, based on QoS rules. These QoS rules may be explicitly provided to the UE (using the PDU Session Establishment/Modification procedure), pre-configured in the UE or implicitly derived by UE by applying reflective QoS.

Reflective QoS enables the UE to map UL user plane traffic to QoS flows by creating UE derived QoS rules in the UE based on the received DL traffic.

A QoS rule contains a QoS rule identifier which is unique within the PDU session, the QFI of the associated QoS flow and a packet filter set for UL and optionally for DL and a precedence value. Additionally, for a dynamically assigned QFI, the QoS rule contains the QoS parameters relevant to the UE (e.g. 5QI, GBR and MBR and the Averaging Window). There can be more than one QoS rule associated with the same QoS Flow (i.e. with the same QFI)

A default QoS rule is required for every PDU Session and associated with the QoS flow of the default QoS rule. The principle for classification and marking of user plane traffic and mapping of QoS flows to NG-RAN resources is illustrated in FIG. 7.

In DL, incoming data packets are classified by the UPF based on SDF templates according to their SDF precedence, (without initiating additional N4 signaling). The UPF conveys the classification of the user plane traffic belonging to a QoS flow through an N3 (and N9) user plane marking using a QFI. The NG-RAN binds QoS flows to NG-RAN resources (i.e. Data Radio Bearers). There is no strict 1:1 relation between QoS flows and NG-RAN resources. It is up to the NG-RAN to establish the necessary NG-RAN resources that QoS flows can be mapped to.

In UL, the UE evaluates UL packets against the packet filter set in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS flow.

Figure 8:
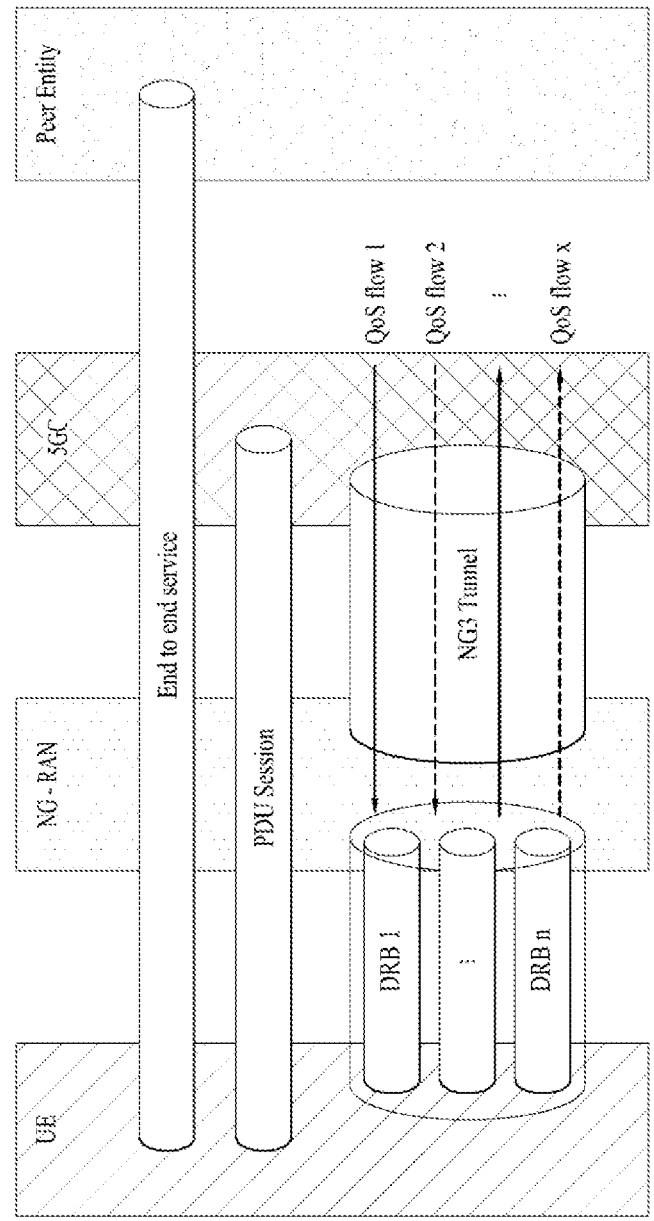
FIG. 8 is a conceptual diagram for 5G QoS model.

FIG. 8 is a conceptual diagram for 5G QoS model.

As shown in the FIG. 8, multiple user plane traffics (e.g, IP flow) can be multiplexed onto the same QoS flow and multiple QoS flows can be multiplexed onto the same DRB (Data Radio Bearer). In DL, 5GC is responsible for the IP flow to QoS flow mapping and NG-RAN is responsible for the QoS flow to DRB mapping. In UL, the UE performs a 2-step mapping of IP flows, in which NAS is responsible for the IP flow to QoS flow mapping, and AS is responsible for the QoS flow to DRB mapping. In other words, the UE maps an IP flow to a QoS flow according to the QoS rules such as default QoS rule, pre-authorised QoS rule and/or reflective QoS rule which 5GC provides to the UE. And then, the UE maps the QoS flow to a DRB according to the AS mapping rules which the NG-RAN provides to the UE.

If the IP flow is not matched to any of QoS rule(s) in the UE, the UE can't map the IP flow to a QoS flow and thus can't transmit UL packet of the IP flow to network since the IP flow doesn't belong to any QoS flows. For handling this case, the UE can trigger a NAS procedure to request to get an appropriate QoS rule. However, it introduces additional delays since the UE has to wait for the response corresponding to the request. The problem becomes severe for urgent UL packet which needs to be transmitted immediately.

This invention relates to a method and apparatus for performing UL packet transmission of IP flow which is not matched to any of QoS rule(s) in the UE.

Figure 9:
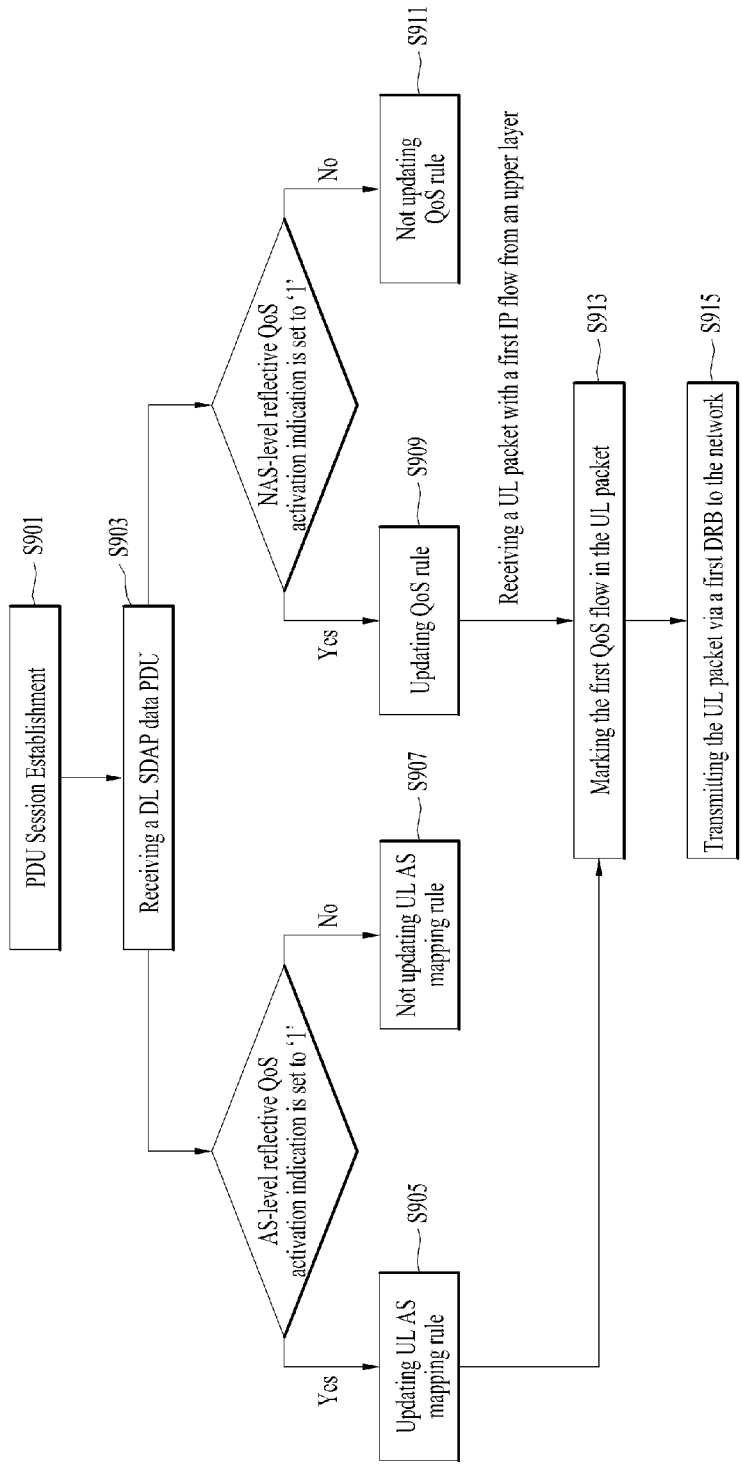
FIG. 9 is a conceptual diagram for performing reflective Quality of Service (QoS) in wireless communication system according to embodiments of the present invention.

FIG. 9 is a conceptual diagram for performing reflective Quality of Service (QoS) in wireless communication system according to embodiments of the present invention.

Some terms of this invention are defined as the followings:

PDU session refers to association between the UE and a data network that provides a PDU connectivity service.

PDU connectivity service refers to a service that provides exchange of PDU (Packet Data Units) between a UE and a data network.

QoS rule refers to a set of information enabling the detection of a service data flow (e.g., IP flow) and defining its associated QoS parameters. It consists of NAS-level QoS profile (e.g., QoS characteristics, QoS marking) and packet filters. Three types of QoS rule are Default QoS Rule, Pre-authorised QoS rule and Reflective QoS rule.

Default QoS rule refers to a mandatory QoS rule per PDU session. It is provided at PDU Session Establishment to UE.

Pre-authorised QoS rule refers to any QoS rule (different from the Default QoS rule) provided at PDU Session Establishment.

Reflective QoS rule refers to the QoS rule which is created by UE based on QoS rule applied on the DL traffic.

QoS marking refers to a scalar that is used as a reference to a specific packet forwarding behaviour Packet filter refers to information for matching service data flows. The format of the packet filters is a pattern for matching the IP 5 tuple (source IP address or IPv6 network prefix, destination IP address or IPv6 network prefix, source port number, destination port number, protocol ID of the protocol above IP). Service data flows are mapped to a QoS flow according to DL/UL packet filter.

QoS flow refers to finest granularity for QoS treatment.

NG (Next Generation) system consists of AMF (Access and Mobility Management Function), SMF (Session Management Function) and UPF (User plane Function).

AS mapping rule refers to a set of information related to the association between QoS flow and the Data Radio Bearer (DRB) transporting that QoS flow.

AS-level reflective QoS refers to updating the UL AS mapping rule in the UE based on the DL packet with QoS flow ID received within a DRB.

PDU refers to Packet Data Unit.

SDU refers to Service Data Unit.

Service Data Adaptation Protocol (SDAP) refers to a user plane AS protocol layer for the 5G QoS model.

During the PDU Session Establishment (S901), UE receives QoS rule(s) related to the PDU session from 5GC, and receives AS mapping rule(s) and DRB configuration information for the PDU session from NG-RAN.

The UL packet filter(s) of QoS rule(s) related to the PDU session is a UL IP flow (i.e. user plane traffic) to QoS flow mapping rule configured to the UE.

The AS-mapping rule(s) is a UL QoS flow to DRB mapping rule configured to the UE.

The UE saves the received QoS rule(s) and AS-mapping rule(s), and establishes DRB such as default DRB and/or Dedicated DRB (non-default DRB).

The default DRB is established by NG-RAN at PDU Session Establishment. If the first packet of the flow is UL packet, if no mapping rule is configured in the UE, the packet is sent through default DRB to the network.

After that, the UE receives a DL SDAP data PDU from NG-RAN via a DL DRB with a first DRB ID (S903).

Preferably, the DL SDAP PDU is a PDU for a SDAP entity which is a higher layer than a PDCP entity of the UE.

Preferably, the DL SDAP PDU includes an AS-level Reflective QoS activation indication indicating whether to perform updating of the Access Stratum (AS) mapping rule in the UE for uplink (UL) and a NAS-level Reflective QoS activation indication indicating whether to perform updating of the Non Access Stratum (NAS) reflective QoS rule for UL.

Preferably, if at least one of the NAS-level reflective QoS activation indication or the AS-level reflective QoS activation indication is set to '1', the DL SDAP PDU further includes a QoS flow ID.

If the AS-level reflective QoS activation indication is set to '1', the UE updates UL AS mapping rule. When the UE updates UL AS mapping rule, a UL DRB mapped to a UL QoS flow with the first QoS flow ID is set to a UL DRB with the first DRB ID (S905). If the AS-level reflective QoS activation indication is set to '0', the UE does not update UL AS mapping rule (S907).

If the NAS-level reflective QoS activation indication is set to '1', the QoS flow ID in the received DL SDAP data PDU is delivered with the retrieved DL SDAP data SDU from the DL SDAP data PDU to upper layer in the UE. When a QoS flow ID with DL traffic is received from lower layer, the UE updates UL QoS rule. When the UE updates UL QoS rule, a UL QoS flow mapped to a UL IP flow with a first IP flow ID of the DL traffic is set to a UL QoS flow with the first QoS flow ID (S909).

If the NAS-level reflective QoS activation indication is set to '0', only the retrieved DL SDAP data SDU is delivered to upper layer in the UE. When only DL traffic is received from lower layer, the UE does not update UL QoS rule (S911).

If both NAS-level Reflective QoS activation indication and AS-level Reflective QoS activation indication are '0', the UE recognizes that the DL SDAP data PDU consists of NAS-level reflective QoS activation indication and AS-level reflective QoS activation indication, excluding the QoS flow ID.

When a UL packet with a first IP flow is received from an upper layer, the UE marks QFI of the first QoS flow, which is mapped to the first IP flow, in the UL packet, if updating of the NAS reflective QoS rule for UL is performed by the NAS-level reflective QoS activation indication being set to 1 (S913), and transmits the UL packet via a first DRB, which is mapped to the first QoS flow ID, to the network, if updating of the AS mapping rule for UL is performed by the AS-level reflective QoS activation indication being set to 1 (S915).

Figure 10:
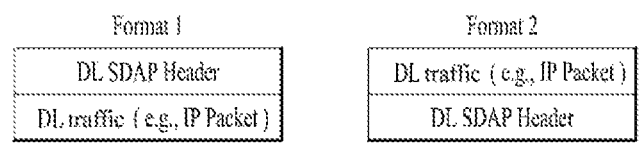
FIG. 10 is an example for format of DL SDAP PDU.
Figure 11:
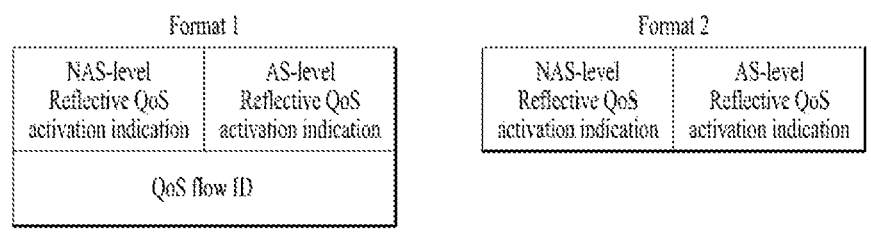
FIG. 11 is an example for format of DL SDAP header.

FIG. 10 is an example for format of DL SDAP data PDU, and FIG. 11 is an example for format of DL SDAP header.

The DL SDAP data PDU consists of a DL Data field and a DL SDAP header. The DL SDAP header can be appended in front of the DL Data (format 1) or at the end of the DL Data (format 2), as shown in the FIG. 10.

As shown in the FIG. 11, the DL SDAP header consists of NAS-level reflective QoS activation indication, AS-level reflective QoS activation indication and QoS flow ID (format 1). NAS-level reflective QoS activation indication and AS-level reflective QoS activation indication are present for every DL SDAP header. In order to decrease protocol overhead, QoS flow ID can be present for DL SDAP header only when it is necessary depending on the values of two reflective QoS activation indications. So, if both NAS-level Reflective QoS activation indication and AS-level Reflective QoS activation indication are '0', the DL SDAP header may not include the QoS flow ID (format 2).

Figure 12:
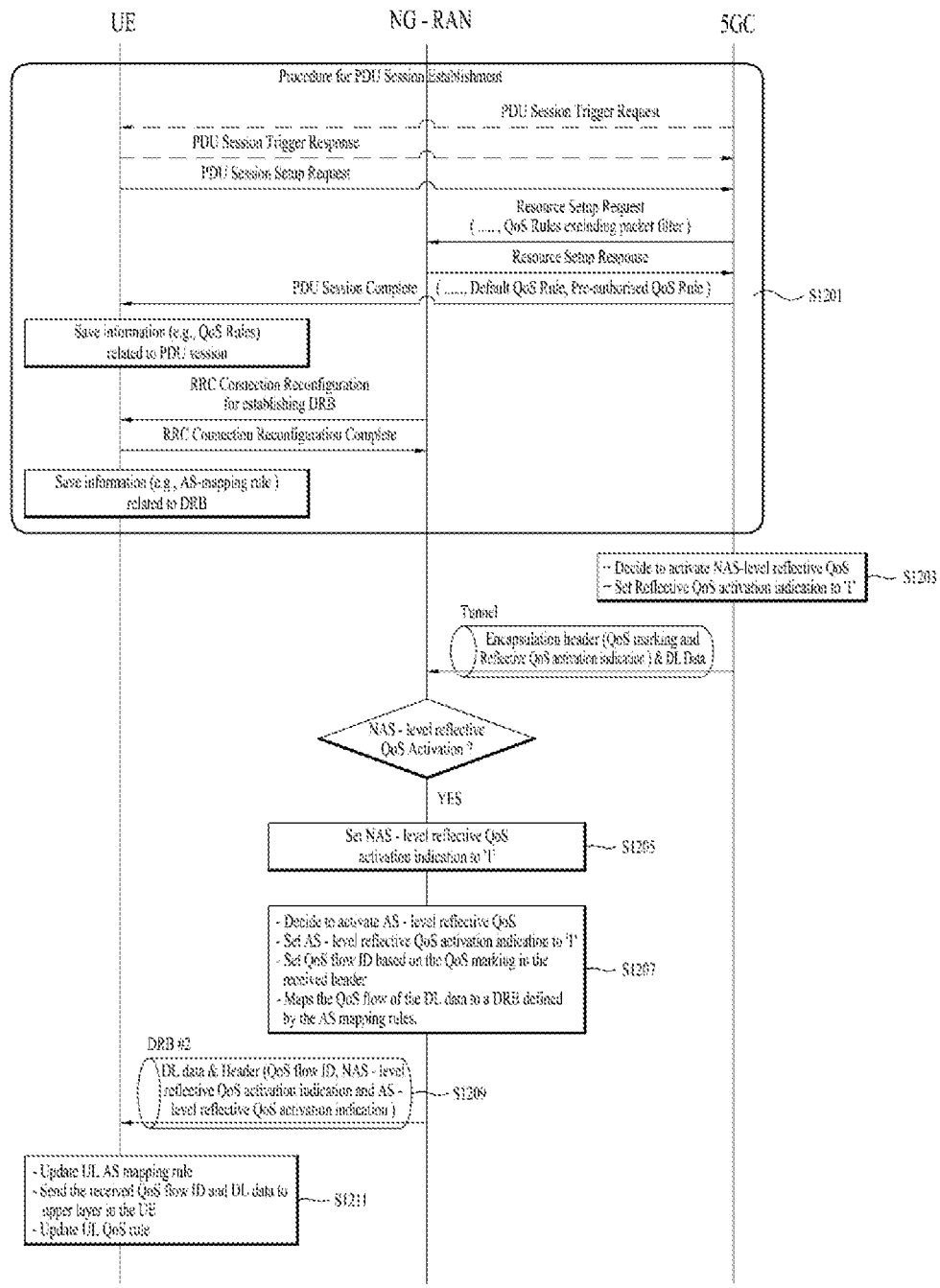
FIGS. 12 and 13 are examples for NAS-level reflective QoS and AS-level reflective QoS are activated according to embodiments of the present invention.

FIG. 12 is an example for NAS-level reflective QoS and AS-level reflective QoS are activated according to embodiments of the present invention.

During the PDU Session Establishment, 5GC transmits QoS rule(s) related to the PDU session to the UE and transmits QoS rule(s) excluding packet filter to the NG-RAN. The NG-RAN sends the UE the RRC message for default DRB establishment of the corresponding PDU session. The RRC message includes some configurations such as AS-mapping rule. The NG-RAN receives RRC message from UE as response to the RRC message.

During the PDU Session Establishment, UE receives QoS rule(s) related to the PDU session from 5GC, and receives AS-mapping rule(s) and default DRB configuration information for the PDU session from NG-RAN. And the UE saves the received QoS rule(s) and AS-mapping rule(s), and establishes default DRB. After that, the UE may update QoS rules by receiving NAS message including QoS rules or by receiving DL packet indicating the Reflective QoS activation (S1201).

When 5GC decides to activate NAS-level reflective QoS, DL data with QoS marking and reflective QoS activation indication is transmitted to NG-RAN (S1203). QoS marking and reflective QoS activation indication are carried in encapsulation header on NG-U i.e. without any changes to the e2e packet header If the reflective QoS activation indication in the received encapsulation header is '1', the NG-RAN sets NAS-level Reflective QoS activation indication of DL SDAP header to '1' (S1205).

If the NG-RAN decides to activate AS-level reflective QoS, the NG-RAN sets AS-level Reflective QoS activation indication of DL SDAP header to '1'. (S1207)

The NG-RAN maps the QoS flow of the DL packet to a DRB defined by the AS mapping rules, and then transmits DL SDAP data PDU to the UE via the DRB (S1209).

In this case, the DL SDAP data PDU includes AS level reflective QoS activation indication and NAS level reflective QoS activation indication and a QoS flow ID.

If the AS-level reflective QoS activation indication and NAS-level reflective QoS activation indication are set to '1', the UE updates UL AS mapping rule, delivers the received QoS flow ID and DL data to upper layer in the UE and updates UL QoS rule (S1211).

Figure 13:
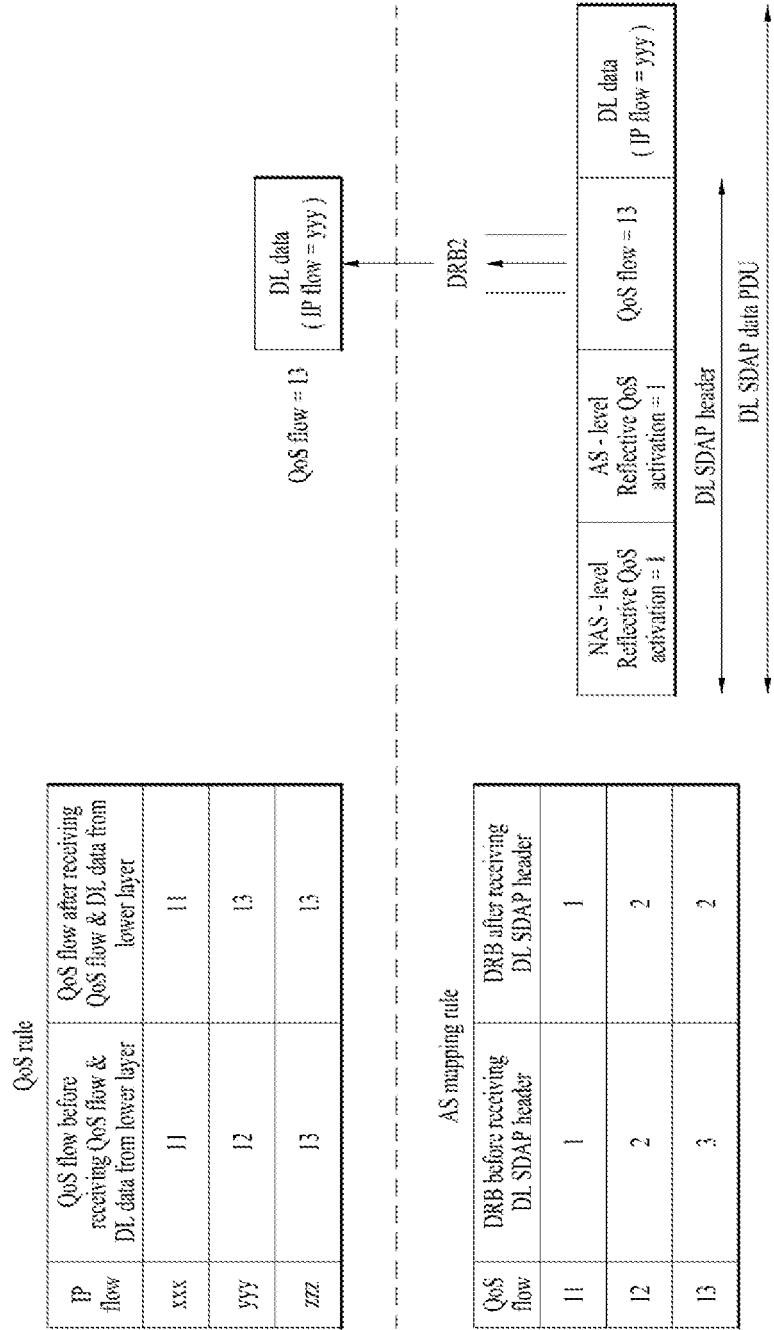

FIG. 13 shows an example for the Steps of S1211.

When receiving a DL SDAP data PDU including QoS flow ID=13 via a DL DRB 2, the UE checks AS-level reflective QoS activation indication and NAS-level reflective QoS activation indication.

If AS-level reflective QoS activation indication and NAS-level reflective QoS activation indication are set to '1', the UE sets a UL DRB mapped to the QoS flow ID=13 to a UL DRB 2 (=updating AS mapping rule), and sets a UL QoS flow mapped to a IP flow ID=yyy to a UL QoS flow ID=13 (=updating NAS reflective QoS rule).

Figure 14:
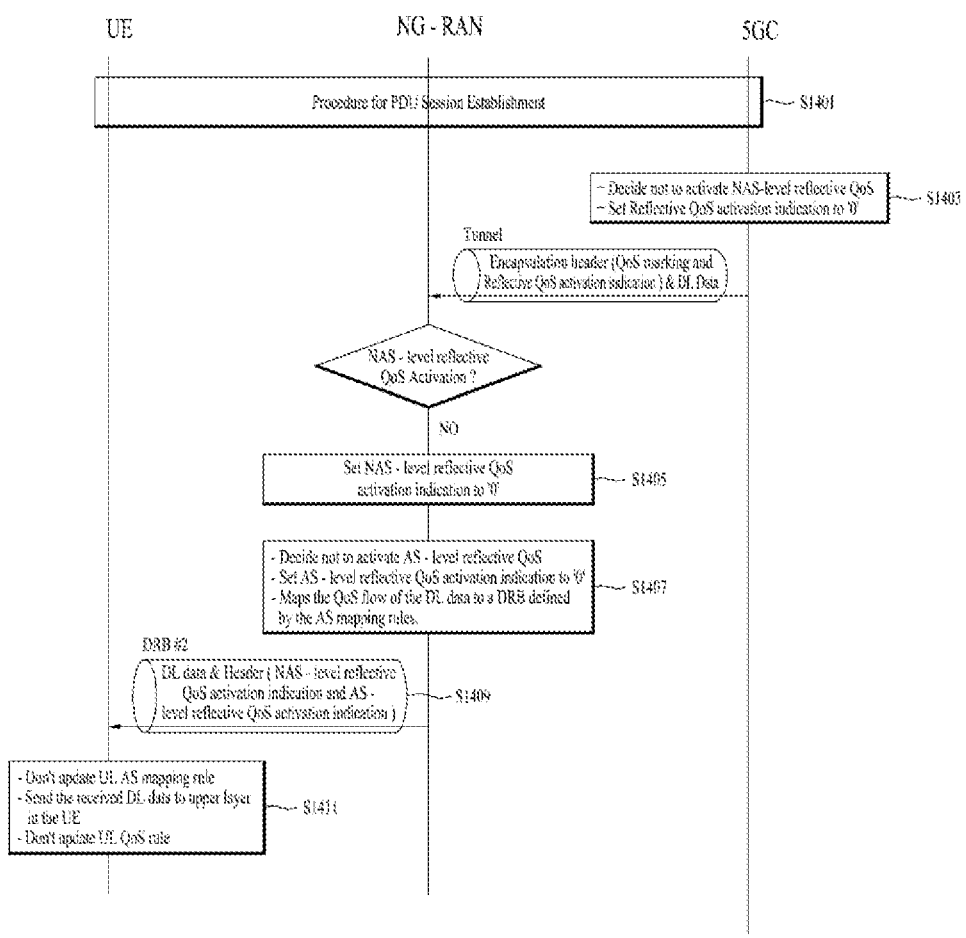
FIGS. 14 and 15 are examples for NAS-level reflective QoS and AS-level reflective QoS are not activated according to embodiments of the present invention.

FIG. 14 is an example for NAS-level reflective QoS and AS-level reflective QoS are not activated according to embodiments of the present invention.

During the PDU Session Establishment, 5GC transmits QoS rule(s) related to the PDU session to the UE and transmits QoS rule(s) excluding packet filter to the NG-RAN. The NG-RAN sends the UE the RRC message for default DRB establishment of the corresponding PDU session. The RRC message includes some configurations such as AS-mapping rule. The NG-RAN receives RRC message from UE as response to the RRC message.

During the PDU Session Establishment, UE receives QoS rule(s) related to the PDU session from 5GC, and receives AS-mapping rule(s) and default DRB configuration information for the PDU session from NG-RAN. And the UE saves the received QoS rule(s) and AS-mapping rule(s), and establishes default DRB. After that, the UE may update QoS rules by receiving NAS message including QoS rules or by receiving DL packet indicating the Reflective QoS activation (S1401).

When 5GC decides not to activate NAS-level reflective QoS, DL data with QoS marking and reflective QoS activation indication is transmitted to NG-RAN (S1403). QoS marking and reflective QoS activation indication are carried in encapsulation header on NG-U i.e. without any changes to the e2e packet header If the reflective QoS activation indication in the received encapsulation header is '0', the NG-RAN sets NAS-level Reflective QoS activation indication of DL SDAP header to '0' (S1405).

If the NG-RAN decides not to activate AS-level reflective QoS, the NG-RAN sets AS-level Reflective QoS activation indication of DL SDAP header to '0' (S1407)

The NG-RAN maps the QoS flow of the DL packet to a DRB defined by the AS mapping rules, and then transmits DL SDAP data PDU to the UE via the DRB (S1409).

In this case, the DL SDAP data PDU includes AS level reflective QoS activation indication and NAS level reflective QoS activation indication without QoS flow ID.

If the AS-level reflective QoS activation indication and NAS-level reflective QoS activation indication are set to '0', the UE doesn't update UL AS mapping rule, delivers the received DL data to upper layer in the UE and doesn't update UL QoS rule (S1411).

Figure 15:
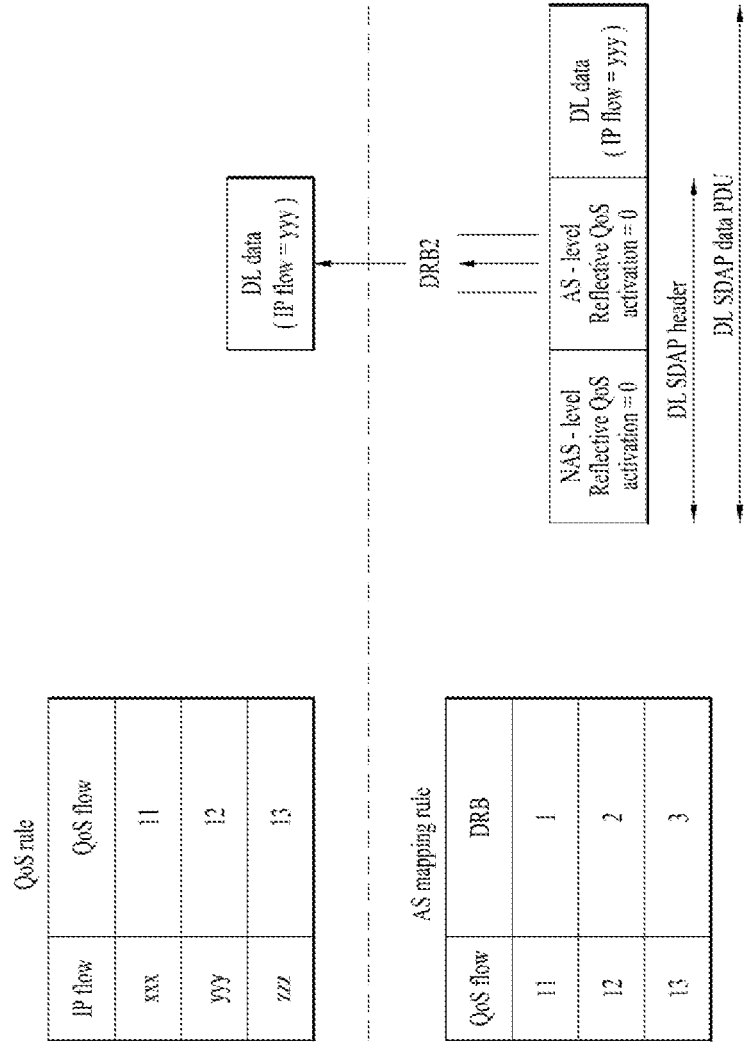

FIG. 15 shows an example for the Steps of S1411.

When receiving a DL SDAP data PDU via a DL DRB 2, the UE checks AS-level reflective QoS activation indication and NAS-level reflective QoS activation indication.

If AS-level reflective QoS activation indication and NAS-level reflective QoS activation indication are set to '0', the UL AS mapping rule and UL QoS rule are not changed at all.

Figure 16:
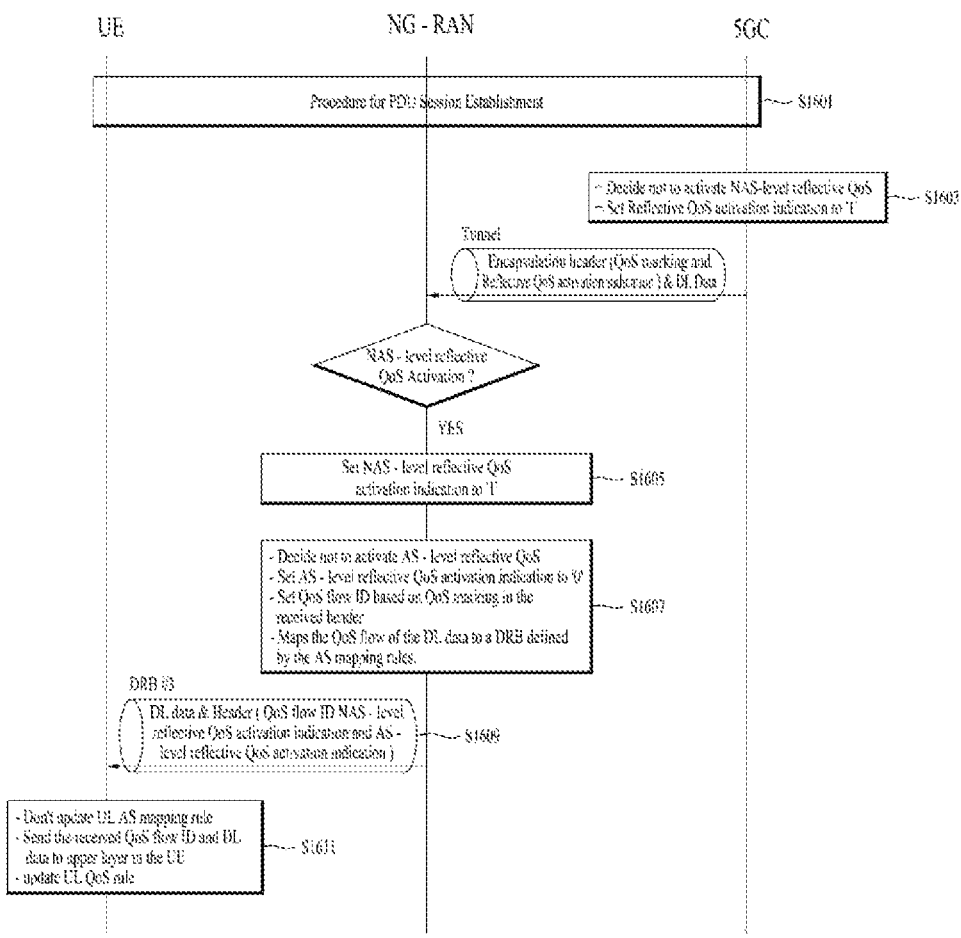
FIGS. 16 and 17 are examples for only NAS-level reflective QoS is activated according to embodiments of the present invention.

FIG. 16 is an example for only NAS-level reflective QoS is activated according to embodiments of the present invention.

During the PDU Session Establishment, 5GC transmits QoS rule(s) related to the PDU session to the UE and transmits QoS rule(s) excluding packet filter to the NG-RAN. The NG-RAN sends the UE the RRC message for default DRB establishment of the corresponding PDU session. The RRC message includes some configurations such as AS-mapping rule. The NG-RAN receives RRC message from UE as response to the RRC message.

During the PDU Session Establishment, UE receives QoS rule(s) related to the PDU session from 5GC, and receives AS-mapping rule(s) and default DRB configuration information for the PDU session from NG-RAN. And the UE saves the received QoS rule(s) and AS-mapping rule(s), and establishes default DRB. After that, the UE may update QoS rules by receiving NAS message including QoS rules or by receiving DL packet indicating the Reflective QoS activation (S1601).

When 5GC decides to activate NAS-level reflective QoS, DL data with QoS marking and reflective QoS activation indication is transmitted to NG-RAN (S1603). QoS marking and reflective QoS activation indication are carried in encapsulation header on NG-U i.e. without any changes to the e2e packet header If the reflective QoS activation indication in the received encapsulation header is '1', the NG-RAN sets NAS-level Reflective QoS activation indication of DL SDAP header to '1' (S1605).

If the NG-RAN decides not to activate AS-level reflective QoS, the NG-RAN sets AS-level Reflective QoS activation indication of DL SDAP header to '0'. (S1607)

The NG-RAN maps the QoS flow of the DL packet to a DRB defined by the AS mapping rules, and then transmits DL SDAP data PDU to the UE via the DRB (S1609).

In this case, the DL SDAP data PDU includes AS level reflective QoS activation indication and NAS level reflective QoS activation indication and QoS flow ID.

If the AS-level reflective QoS activation indication is set to '0' and NAS-level reflective QoS activation indication is set to '1', the UE doesn't update UL AS mapping rule, delivers the received QoS flow ID and DL data to upper layer in the UE and updates UL QoS rule (S1611).

Figure 17:
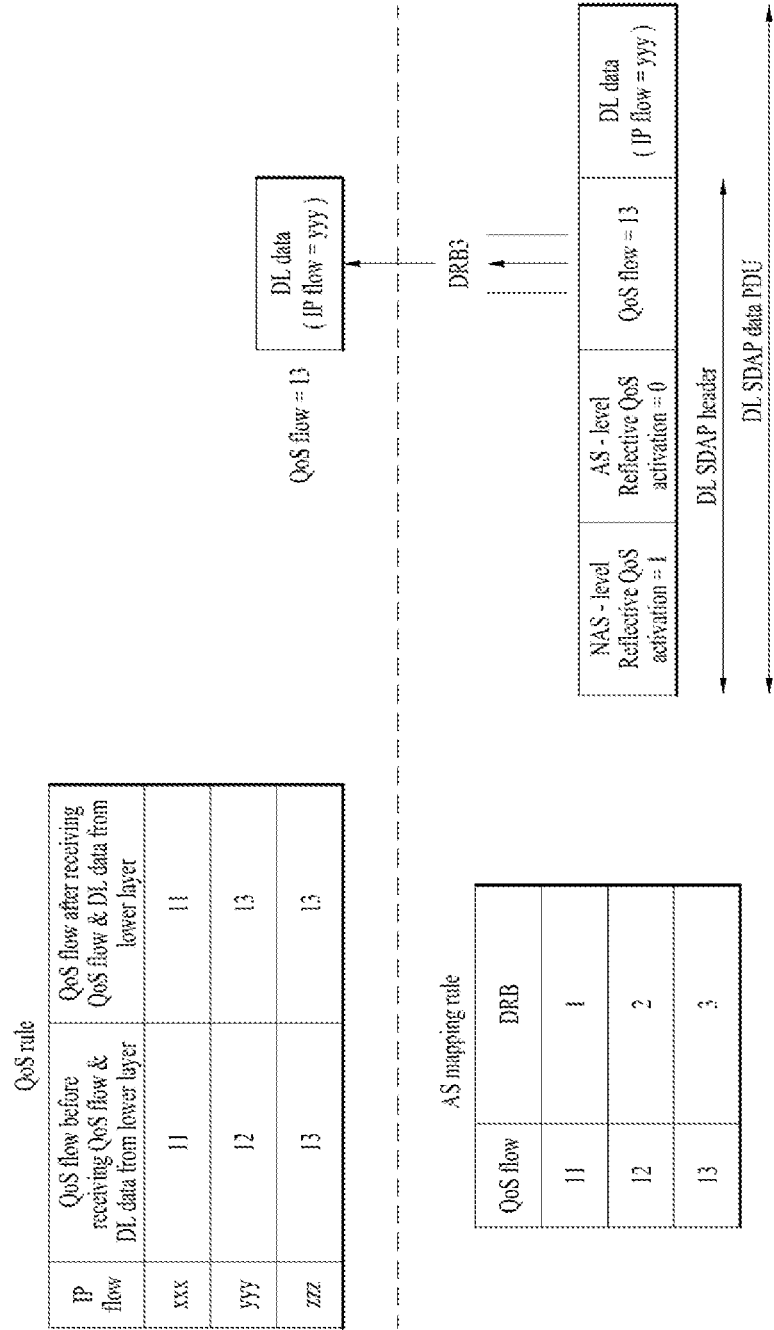

FIG. 17 shows an example for the Steps of S1611.

When receiving a DL SDAP data PDU including QoS flow ID=13 via a DL DRB 3, the UE checks AS-level reflective QoS activation indication and NAS-level reflective QoS activation indication.

If the AS-level reflective QoS activation indication is set to '0' and NAS-level reflective QoS activation indication is set to '1', the UE sets a UL QoS flow mapped to a IP flow ID=yyy to a UL QoS flow ID=13 (=updating NAS reflective QoS rule), and UL AS mapping rule doesn't change at all.

Figure 18:
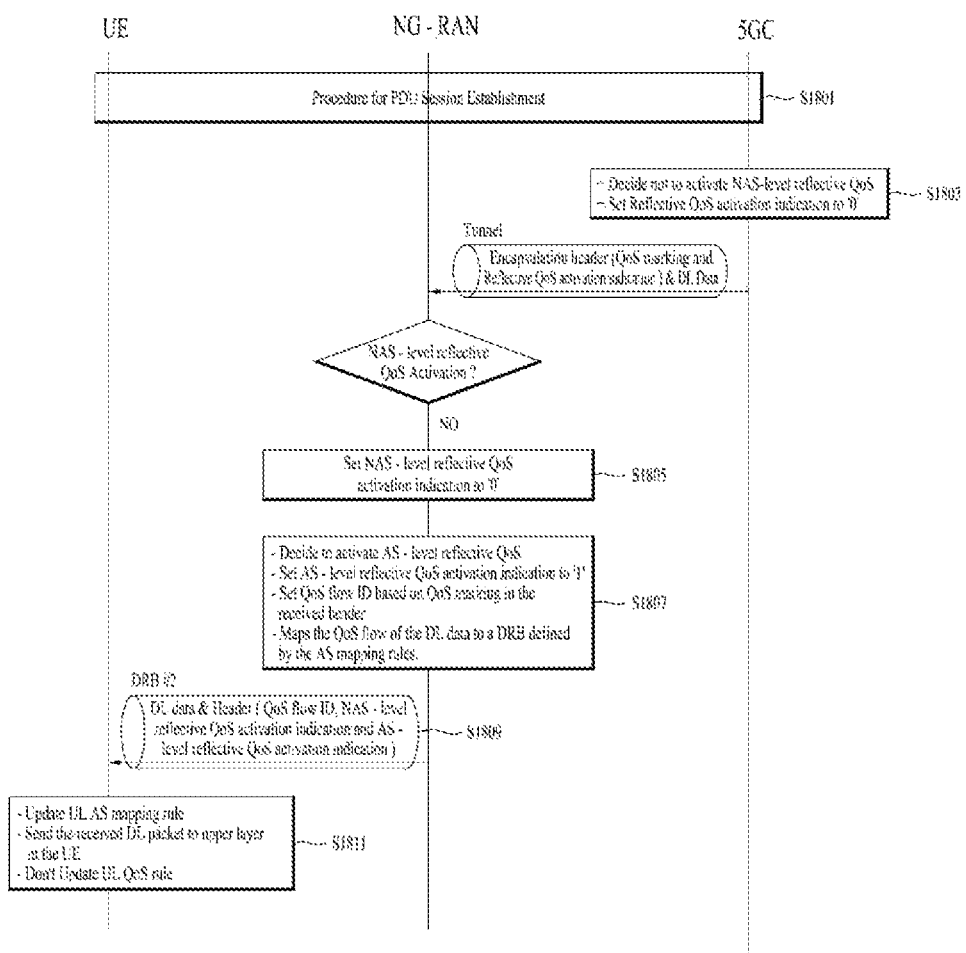
FIGS. 18 and 19 are examples for only AS-level reflective QoS is activated according to embodiments of the present invention.

FIG. 18 is an example for only AS-level reflective QoS is activated according to embodiments of the present invention.

During the PDU Session Establishment, 5GC transmits QoS rule(s) related to the PDU session to the UE and transmits QoS rule(s) excluding packet filter to the NG-RAN. The NG-RAN sends the UE the RRC message for default DRB establishment of the corresponding PDU session. The RRC message includes some configurations such as AS-mapping rule. The NG-RAN receives RRC message from UE as response to the RRC message.

During the PDU Session Establishment, UE receives QoS rule(s) related to the PDU session from 5GC, and receives AS-mapping rule(s) and default DRB configuration information for the PDU session from NG-RAN. And the UE saves the received QoS rule(s) and AS-mapping rule(s), and establishes default DRB. After that, the UE may update QoS rules by receiving NAS message including QoS rules or by receiving DL packet indicating the Reflective QoS activation (S1801).

When 5GC decides not to activate NAS-level reflective QoS, DL data with QoS marking and reflective QoS activation indication is transmitted to NG-RAN (S1803). QoS marking and reflective QoS activation indication are carried in encapsulation header on NG-U i.e. without any changes to the e2e packet header If the reflective QoS activation indication in the received encapsulation header is '0', the NG-RAN sets NAS-level Reflective QoS activation indication of DL SDAP header to '0' (S1805).

If the NG-RAN decides to activate AS-level reflective QoS, the NG-RAN sets AS-level Reflective QoS activation indication of DL SDAP header to '1'. (S1807)

The NG-RAN maps the QoS flow of the DL packet to a DRB defined by the AS mapping rules, and then transmits DL SDAP data PDU to the UE via the DRB (S1809).

In this case, the DL SDAP data PDU includes AS level reflective QoS activation indication and NAS level reflective QoS activation indication and QoS flow ID.

If the AS-level reflective QoS activation indication is set to '1' and NAS-level reflective QoS activation indication is set to '0', the UE updates UL AS mapping rule, delivers DL data to upper layer in the UE and doesn't update UL QoS rule (S1811).

Figure 19:
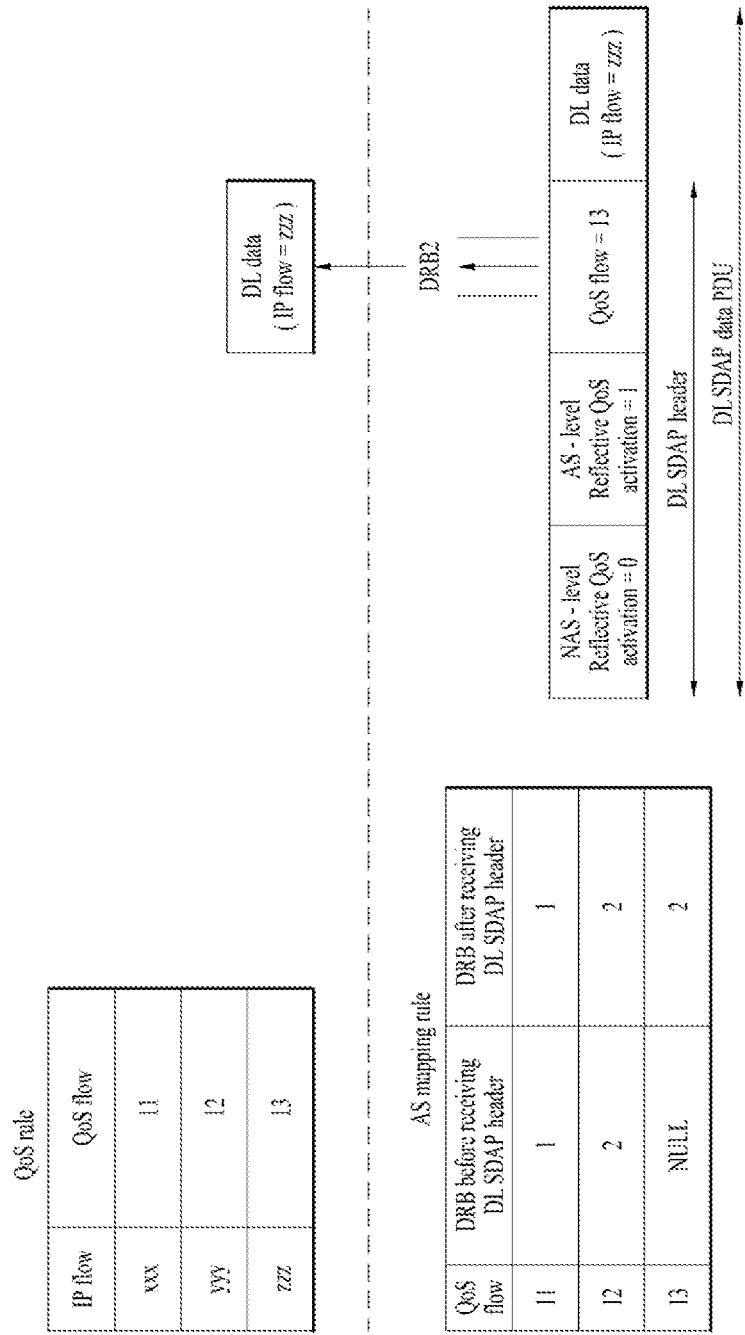

FIG. 19 shows an example for the Steps of S1811.

When receiving a DL SDAP data PDU including QoS flow ID=13 via a DL DRB 2, the UE checks AS-level reflective QoS activation indication and NAS-level reflective QoS activation indication.

If the AS-level reflective QoS activation indication is set to '1' and NAS-level reflective QoS activation indication is set to '0', the UE sets a UL DRB mapped to the QoS flow ID=13 to a UL DRB 2 (=updating AS mapping rule), and QoS rule doesn't change at all.

Figure 20:
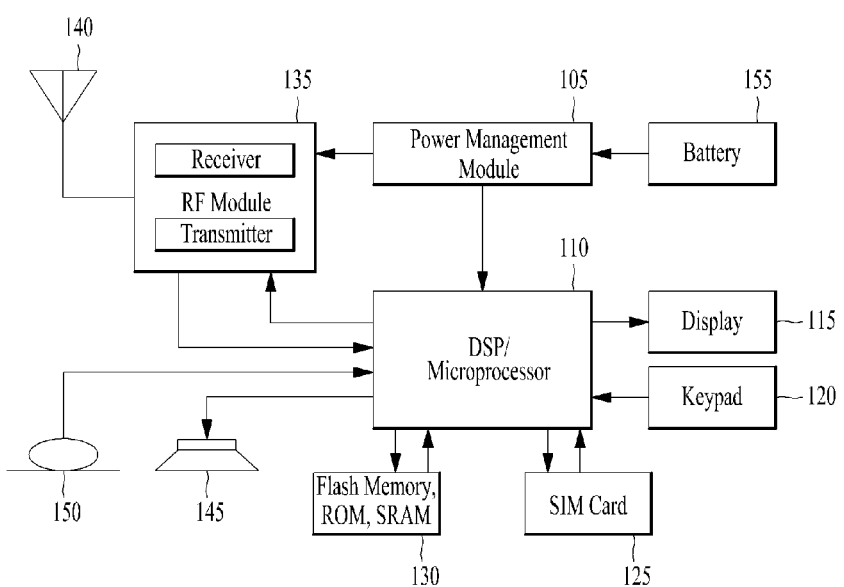
FIG. 20 is a block diagram of a communication apparatus according to an embodiment of the present invention.

FIG. 20 is a block diagram of a communication apparatus according to an embodiment of the present invention.

The apparatus shown in FIG. 20 can be a user equipment (UE) and/or eNB adapted to perform the above mechanism, but it can be any apparatus for performing the same operation.

As shown in FIG. 20, the apparatus may comprises a DSP/microprocessor (110) and RF module (transceiver;

135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 20 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 20 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method performed by a user equipment (UE) operating in a wireless communication system, the method comprising:
   receiving a downlink (DL) Service Data Adaptation Protocol (SDAP) Protocol Data Unit (PDU) via a DL Data Radio Bearer (DRB), wherein the DL SDAP PDU comprises a DL SDAP header that is prepended to DL Data, and the DL SDAP header comprises (i) a Quality of service Flow Identification (QFI), (ii) a first indication related to a Quality of Service (QoS) flow for an Access Stratum (AS) level, and (iii) a second indication related to a QoS flow for a Non Access Stratum (NAS) level;
   based on the first indication being set to '1': storing, by a SDAP entity of the UE, a DL mapping rule between QoS flow and the DRB of the DL SDAP PDU as a UL mapping rule between QoS flow and DRB for uplink (UL) transmission; and
   based on the second indication being set to '1': informing, by the SDAP entity to a NAS layer of the UE, the QFI of the DL SDAP PDU.

2. The method according to claim 1, wherein in a state in which at least one of the first indication or the second indication is set to '1', the DL SDAP PDU comprises the QFI.

3. The method according to claim 1, wherein in a state in which both of the first indication and the second indication are set to '0', the DL SDAP PDU does not comprise include the QFI.

4. The method according to claim 1, further comprising:
   based on the first indication being set to '0', not storing the DL mapping rule as the UL mapping rule.

5. The method according to claim 1, further comprising:
   based on the second indication being set to '0', not informing the QFI to the NAS layer.

6. The method according to claim 1, wherein the SDAP entity of the UE is a higher layer than a Packet Data Convergence Protocol (PDCP) entity of the UE.

7. The method according to claim 1, further comprising:
   receiving, by the SDAP entity of the UE, a UL SDAP PDU from an upper layer;
   marking a QoS flow of the QFI in the UL SDAP PDU based on the QFI informed to the NAS layer and based on the second indication being set to 1; and
   transmitting the UL SDAP PDU via a UL DRB, based on the DL mapping rule having been stored as the UL mapping rule, and based on the first indication being set to 1.

8. The method according to claim 1, wherein the SDAP entity of the UE is configured to manage routing between QoS flows and DRBs.

9. The method according to claim 7, further comprising:
based on the DL mapping rule not having been stored as the UL mapping rule, using a default mapping rule as the UL mapping rule.

10. The method according to claim 1, wherein the QFI of the DL SDAP PDU identifies a QoS flow to which the DL SDAP PDU is associated.

11. A User Equipment (UE) configured to operate in a wireless communication system, the UE comprising:
a Radio Frequency (RF) module;
at least one processor; and
at least one computer memory operably connectable to the at least one processor and storing instructions that, when executed by the at least one processor, perform operations comprising:
receiving a downlink (DL) Service Data Adaptation Protocol (SDAP) Protocol Data Unit (PDU) via a DL Data Radio Bearer (DRB) through the RF module, wherein the DL SDAP PDU comprises a DL SDAP header that is prepended to DL Data, and the DL SDAP header comprises (i) a Quality of service Flow Identification (QFI), (ii) a first indication related to a Quality of Service (QoS) flow for an Access Stratum (AS) level, and (iii) a second indication related to a QoS flow for a Non Access Stratum (NAS) level;
based on the first indication being set to '1': storing, by a SDAP entity of the UE, a DL mapping rule between QoS flow and DRB of the DL SDAP PDU as a UL mapping rule between QoS flows and DRBs for uplink (UL) transmission; and
based on the second indication being set to '1': informing, by the SDAP entity to a NAS layer of the UE, the QFI is informed of the DL SDAP PDU.

12. The UE according to claim 11, wherein in a state in which at least one of the first indication or the second indication is set to '1', the DL SDAP PDU comprises the QFI.

13. The UE according to claim 11, wherein in a state in which both of the first indication and the second indication are set to '0', the DL SDAP PDU does not comprise the QFI.

14. The UE according to claim 11, wherein the operations further comprise:
based on the first indication being set to '0', not storing the DL mapping rule as the UL mapping rule.

15. The UE according to claim 11, wherein the operations further comprise:
based on the second indication being set to '0', not informing the QFI to the NAS layer.

16. The UE according to claim 11, wherein the SDAP entity of the UE is a higher layer than a Packet Data Convergence Protocol (PDCP) entity of the UE.

17. The UE according to claim 11, wherein the operations further comprise:
receiving, by the SDAP entity of the UE, a UL SDAP PDU from an upper layer;
marking a QoS flow of the QFI in the UL SDAP PDU based on the QFI informed to the NAS layer and based on the second indication being set to 1; and
transmitting the UL SDAP PDU via a UL DRB, based on the DL mapping rule having been stored as the UL mapping rule, and based on the first indication being set to 1.

* * * * *